Figure 1:
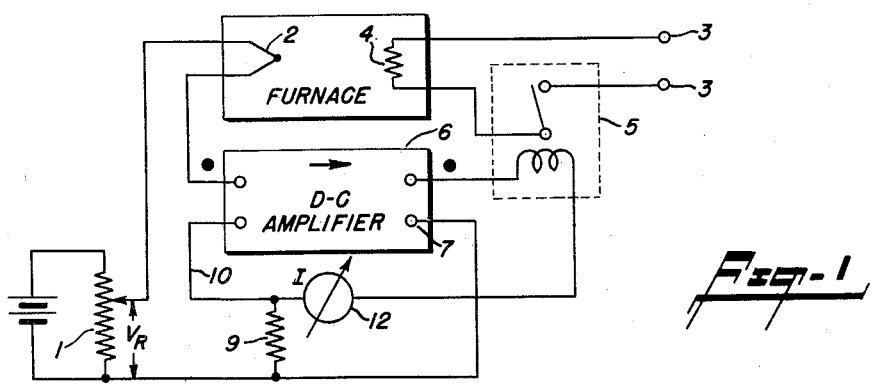

Oct. 21, 1958 R. W. GILBERT 2,857,104
FEEDBACK NETWORK FOR CONTROL SYSTEMS
Filed April 19, 1956

ROSWELL W. GILBERT
INVENTOR.

BY
*Rudolph J. Jurick*
ATTORNEY

United States Patent Office 2,857,104
Patented Oct. 21, 1958

2,857,104

FEEDBACK NETWORK FOR CONTROL SYSTEMS

Roswell W. Gilbert, Montclair, N. J., assignor, by mesne assignments, to Daystrom, Incorporated, Murray Hill, N. J., a corporation of New Jersey Application April 19, 1956, Serial No. 579,186

9 Claims. (Cl. 236—15)

This invention pertains to a feedback network for use in a temperature control system generally, and more particularly to a network which will provide derivative and reset functions with transient stabilization when used with an amplifier in a temperature control system.

The regulation of exact temperatures in thermal systems with the provision of stability and accuracy is rather difficult to accomplish in actual practice. Thermal systems such as practical furnaces and ovens have distributed rather than lumped parameters, and the mathematical configuration is invariably very complex. A differential equation expressive of a thermal system would not only be non-linear but would include high orders to even approximate the system. Theoretically, if an electrical network could be made the exact equivalent of the thermal system and utilized as a secondary feedback element to damp the control function, the resultant control would be perfect. But this is completely impossible in even simple thermal systems. The best that practice can afford in equipment for general service is to include the first three terms of the differential equation of the system in a practical lumped-constant network, in appropriate amounts for adequate damped control. The damping influences corresponding to the second and third terms of the system equation are called respectively the "derivative" and "reset" functions. The derivative function anticipates approach of the system on a time-rate basis, and the reset function locates the average axis of steady-state oscillation at the control point. The result is a major improvement in control performance.

Thus, it is an object of my invention to provide a passive network in the secondary feedback circuit of a thermal control system using an amplifier, whereby derivative and reset functions are provided to obtain an improved control performance.

Figure 2:
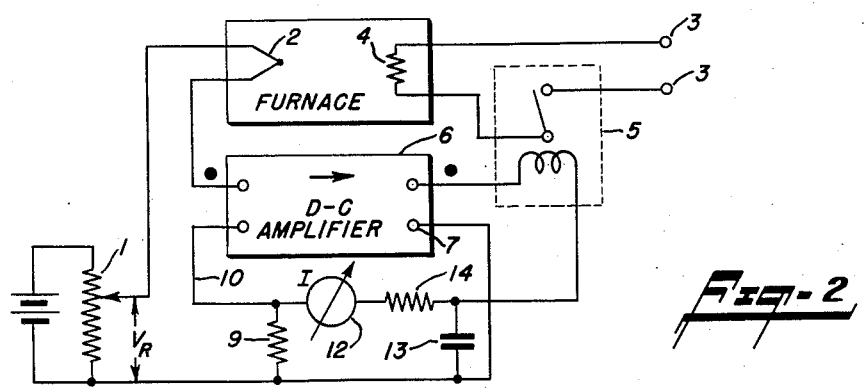
Figure 3:
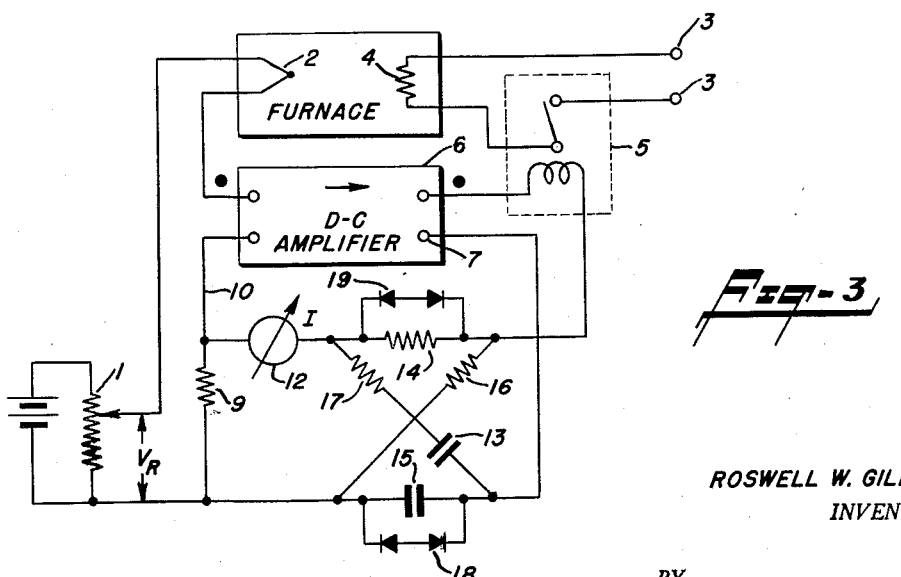

In the drawings wherein like reference characters denote like parts;

Figure 1 is a schematic circuit diagram of a thermal control system utilizing a D.-C. amplifier provided with first order feedback through a mutual resistor, Figure 2 is similar to Figure 1 except that the D.-C. amplifier is provided with an integrating network in a secondary feedback path, and Figure 3 is similar to Figure 1 except that the D.-C. amplifier is provided with a complex passive network of my invention in a secondary feedback path.

Referring to Figure 1 of the drawings, a D.-C. reference potential Vr is obtained from a potentiometer 1 and is applied to a temperature responsive device 2, which may be a thermocouple as shown. An A.-C. power source connected to the terminals 3 feeds power to a heating element 4, which may be the heating element of a practical furnace, stove, small metallurgical furnace or the like. A power relay 5 is utilized to control the operation of the heating element, and in the simplest case the heating power is applied as a step function, although the principle of my invention is also applicable to the case wherein varying power is applied continuously to the heater. The D.-C. reference potential, Vr, is of such a value as to apply a potential to the thermocouple 2 which will correspond to the desired furnace temperature. If the furnace temperature increases above the desired level, an error signal voltage will be produced as the difference between the thermocouple voltage and the reference voltage. This error signal voltage is applied to the input of a D.-C. amplifier 6. Extending from an output terminal 7 of the D.-C. amplifier 6 is the major feedback loop which is connected to a mutual resistor 9. The major feedback current flows through the mutual resistor 9 and then to a feedback input line 10. The secondary feedback loop includes the operating coil of the power relay 5, and is connected to the feedback input line 10 through an indicating instrument 12. The secondary feedback loop voltage is developed across the mutual resistor 9. The operating coil of the power relay 5 is arranged to operate the relay contacts as the output current (I) crosses through zero, so as to apply power to the heating element 4 when the temperature is lower than the reference temperature, and to cut off power to the heating element when the temperature is higher than the reference temperature.

The thermal control system of Figure 1 results in simple control by correction of the first order of the thermal equation only. First order control of this sort can only be completely effective if the controlled system has no time lag and is linear, which is not the case, generally, in thermal systems. The terms of order higher than the first order terms of the thermal equation may be called damping terms, and so the single first order system of Figure 1 may be called undamped.

The current corresponding to the error signal voltage is feedback-balanced by the output current (I) through the mutual resistor 9, so that the indicating instrument 12, responsive to current (I), will monitor the system by indicating the control error. The indicating instrument 12 may be calibrated in terms of temperature deviation, allowing the control error to be indicated directly in terms of temperature on the indicating instrument.

Figure 2 shows the thermal control system circuit of Figure 1 modified by inclusion of an integrating feedback parameter in the form of a shunt capacitor 13 and series resistor 14 in the secondary feedback path. By feedback theory, the D.-C. amplifier is then responsive to the inverse feedback function, or the time derivative of the error signal. The time-constant of this integrating R-C combination must be large relative to the time period of a radian of oscillation of the balanced power system. The effect of the derivative function of the D.-C. amplifier is to turn the power on and off when the rate of change of temperature crosses zero, or at the peaks of the cyclic temperature changes. The power oscillations are now out of phase with the temperature, and the power is on only when the temperature is falling and off only when the temperature is rising. The cyclic rate is now faster, and the magnitude of the temperature oscillation is reduced.

In the idealized steady-state condition wherein the step function power duty cycle is balanced and symmetrical, the power is on and off for equal intervals. Under this condition of balanced power application the average axis of the temperature fluctuations agrees with the control point determined by the reference voltage Vr. However, when the power is unbalanced the average axis of the temperature curve is increased or decreased from that of the control point as determined by the reference voltage Vr. This is the functional defect that requires "reset" to, in effect, cause the average axis to shift into coincidence with the temperature control point. Figure 3 shows the thermal control system of Figure 2 modified by inclusion of additional passive circuit elements, two of which elements, to wit, the capacitor 15 in series with the primary feedback circuit and the resistor 16 in shunt across the feedback lines, provide the system with the reset function. The time-constant of this reset R–C parameter must be made still longer than the derivative time-constant due to capacitor 13 and resistor 14, and preferably several times as long. The effect of the reset parameter will be to shift the average axis of the unbalanced power to agree with the control point established by the reference voltage. The action of the composite network may best be understood by noting that the network now has a zero D.-C. transfer function. Thus, the average value of the feedback error must correspondingly also be zero. If stability criteria are not violated the system must perform with an average error equal to zero. Stability requires that the reset time-constant be greater than the derivative time-constant which is in turn greater than the time period of a radian of oscillation. It is appropriate to have the time-constants progress by orders of 5 or more. It should be noted that if the derivative and reset terms are equal, the feedback circuit becomes a balanced bridge and no feedback can develop.

The transient response of any practical system must be considered for satisfactory cold starting or reaction to thermal loads and control point adjustments. Primarily, the full derivative function is intolerable of even very small input disturbances such as hum or noise; these have high level derivatives that will obscure the control action. In practice, therefore, it is necessary to include some first-order feed-back around the differentiating function. Most conveniently, this can take the form of a small resistance 17 in series with capacitor 13. And secondly, warm-up or cool-off periods large with respect to the reset time constant will load up capacitor 15 and saturate the amplifier with voltage burden. This requires an additional form of first-order feedback around capacitor 15 effective before the amplifier saturates, but which is ineffective in steady state. This can be accomplished by shunting capacitor 15 and resistor 14 with potential-biased diodes 18 and 19 that become conducting at a voltage level beyond the steady-state excursions but at a voltage lower than the saturation potential level of the amplifier.

The biased diodes are in the form of series-opposed silicon diodes having Zener voltages of an appropriate bias level. A pair of series-connected Zener diodes are equivalent to a pair of parallel-connected high inverse diodes, each with a reverse-potential bias equal to the Zener voltage. The net effect is to shunt capacitor 15 and resistor 14 only when the element voltage becomes equal to the Zener voltage of the diodes.

The following are an indication of the values of components found to be satisfactory in a system of the type described for use in controlling a small metallurgical furnace:

| | | |
|---|---|---|
| Resistance 14 | ohms | 10,000 |
| Resistance 16 | do | 50,000 |
| Capacitance 13 | mfd | 250 |
| Capacitance 15 | mfd | 250 |
| Derivative time constant | sec | 2.5 |
| Reset time constant | sec | 12.5 |
| Current I | μa | ±50 |
| Resistance 9 | ohms | 100 |
| Resistance 17 | do | 100 |
| Diode bias | volts | 5 |

The capacitors should have intrinsic leakage time-constants much larger than the circuit time-constants; otherwise, leakage current will cause an averaging error to develop. Tantalum electrolytic capacitors are indicated as the most practical type. The Zener diodes provide effective protection to the capacitors against over-voltage.

Thus it may be seen that my invention provides a network for use in the feedback circuit of an amplifier in a temperature controlled thermal system whereby the derivative damping and reset functions are obtained.

While, in accordance with the provisions of the patent statutes, I have illustrated and described a practical embodiment of my invention, it will be apparent to those skilled in the art that changes may be made in the form of the apparatus described without departing from the spirit and scope of the invention as set forth in the following claims.

I claim:

1. A temperature control system for a furnace or the like having a heating means, a temperature-sensitive element for developing a first potential which varies with the furnace temperature, a source of reference potential applied in opposing sense to the first potential, and electrically-actuated means controlling the heat applied to the furnace by the heating means; said control system comprising an amplifier having its input circuit energized through a feedback resistor by the difference in potential between the reference potential and the said first potential; a first and a second resistor, said resistors having one end connected together and the other ends individually connected to the ends of the feedback resistor; a lead connecting the electrically-actuated control means between one amplifier output terminal and the common connection of the said first and second resistors; a first and a second capacitor, said capacitors having one end connected together and the other ends individually connected to the ends of the feedback resistor; a lead connecting the other amplifier output terminal to the common connection of the said first and second capacitors; a first pair of diodes connected in series opposition and across the said first resistor; and a second pair of diodes connected in series opposition and across the said second capacitor, each of the said diodes having a high inverse voltage characteristic up to a predetermined voltage, the impedance of the said diodes above the said predetermined voltage being small and substantially constant.

2. A temperature control system for apparatus having a heating means, said system comprising a temperature sensitive element for developing a first potential which varies with the temperature of the said apparatus; a source of reference potential connected to the said element in opposing sense; a direct current amplifier; a feedback resistor; means applying to the amplifier input circuit an error voltage comprising the differential sum of the said first potential, the reference potential, and potential appearing across the said feedback resistor; a first feedback circuit comprising a shunt capacitor and a series resistor connecting the amplifier output circuit and the said feedback resistor; a second feedback circuit comprising a shunt resistor and a series capacitor connecting the amplifier output circuit and said feedback resistor, the exponential time constant of the said second feedback circuit being substantially larger than the said first feedback circuit; and means responsive to the said direct current amplifier output controlling the said heating means.

3. The invention as recited in claim 2 including an indicating meter interposed in series circuit connection with the said first and second feedback circuits.

4. The invention as recited in claim 2 including a resistor in series circuit connection with the said shunt capacitor in the said first feedback circuit.

5. The invention as recited in claim 2 including a first pair of diodes connected in series opposition and across the series resistor in the said first feedback circuit; and a second pair of diodes connected in series opposition and across the series capacitor in the said second feedback circuit, each of the said diodes having a high inverse voltage characteristic up to a predetermined voltage, the impedance of the diodes above the said predetermined voltage being small and substantially constant.

6. A temperature control system for apparatus having a heating means, said system comprising a temperature sensitive element for developing a first potential which varies with the temperature of the said apparatus; a source of reference potential connected to the said element in opposing sense; a direct current amplifier; a feedback resistor; means applying to the amplifier input circuit an error voltage comprising the differential sum of the said first potential, the reference potential and potential appearing across the said feedback resistor; a four-arm feedback bridge network having a first, second, third and fourth terminal, a first capacitor connected between the said second and third terminals, a first resistor connected between the said first and third terminals, a second resistor connected between the said first and fourth terminals, a second capacitor connected between the said second and fourth terminals, the exponential time constant of the said first resistor and first capacitor being substantially larger than the exponential time constant of the said second resistor and second capacitor; means connecting the amplifier output circuit to the said first and second bridge terminals; means connecting the said feedback resistor across the said third and fourth bridge terminals; and means responsive to the said direct current amplifier output for controlling the said heating means.

7. The invention as recited in claim 6 including an indicating meter in series circuit connection with the said bridge network between the said direct current amplifier output circuit and the said feedback resistor.

8. The invention as recited in claim 6 including a resistor in series circuit connection with the said first capacitor.

9. The invention as recited in claim 6 including a first pair of diodes connected in series opposition and across the said first resistor; and a second pair of diodes connected in series opposition and across the said second capacitor, each of the said diodes having a high inverse voltage characteristic up to a predetermined voltage, the impedance of the diodes above the said predetermined voltage being small and substantially constant.

References Cited in the file of this patent

UNITED STATES PATENTS

| | | |
|---|---|---|
| 2,376,513 | Shaffer | May 22, 1945 |
| 2,690,647 | Woodward | Oct. 5, 1954 |
| 2,724,040 | Mouzon | Nov. 15, 1955 |
| 2,730,618 | Michaels | Jan. 10, 1956 |